United States Patent
Zhao et al.

(10) Patent No.: US 10,327,198 B2
(45) Date of Patent: Jun. 18, 2019

(54) DISCOVERY SIGNAL PROCESSING METHOD AND BASE STATION

(71) Applicant: ZTE CORPORATION, Shenzhen, Guangdong Province (CN)

(72) Inventors: Yajun Zhao, Shenzhen (CN); Linmei Mo, Shenzhen (CN); Hanqing Xu, Shenzhen (CN)

(73) Assignee: ZTE Corporation, Shenzhen (CN)

(*) Notice: Subject to any disclaimer, the term of this patent is extended or adjusted under 35 U.S.C. 154(b) by 169 days.

(21) Appl. No.: 15/313,880

(22) PCT Filed: Sep. 17, 2014

(86) PCT No.: PCT/CN2014/086755
§ 371 (c)(1),
(2) Date: Nov. 23, 2016

(87) PCT Pub. No.: WO2015/180299
PCT Pub. Date: Dec. 3, 2015

(65) Prior Publication Data
US 2017/0195942 A1    Jul. 6, 2017

(30) Foreign Application Priority Data
May 27, 2014 (CN) .......................... 2014 1 0228839

(51) Int. Cl.
*H04W 48/08* (2009.01)
*H04W 48/12* (2009.01)
(Continued)

(52) U.S. Cl.
CPC ........... *H04W 48/08* (2013.01); *H04L 5/0051* (2013.01); *H04L 5/0053* (2013.01); *H04W 24/02* (2013.01);
(Continued)

(58) Field of Classification Search
CPC ...................................................... H04W 48/08
See application file for complete search history.

(56) References Cited

U.S. PATENT DOCUMENTS

| 5,040,238 A | 8/1991 | Comroe et al. |
| 8,493,887 B2 * | 7/2013 | Palanki ................. H04W 76/14 370/254 |

(Continued)

FOREIGN PATENT DOCUMENTS

| CN | 102111879 A | 6/2011 |
| CN | 102263723 A | 11/2011 |

(Continued)

OTHER PUBLICATIONS

International Search Report and Written Opinion dated Feb. 27, 2015 in PCT Patent Application No. PCT/CN2014/086755.
(Continued)

*Primary Examiner* — Andrew Lai
*Assistant Examiner* — Andrew C Lee
(74) *Attorney, Agent, or Firm* — Plumsea Law Group, LLC

(57) ABSTRACT

A processing method for a discovery signal and a base station, the method includes: a base station configuring a part of available resources, which are taken as a Discovery Signal DS resource, of a specified reference signal in a first scenario; and the base station transmitting a DS according to a DS resource configuration; the base station includes a configuration module and a transmission module.

16 Claims, 1 Drawing Sheet

(51) Int. Cl.
*H04L 5/00* (2006.01)
*H04W 24/02* (2009.01)
*H04W 24/10* (2009.01)
*H04W 56/00* (2009.01)
*H04W 24/08* (2009.01)
*H04W 88/08* (2009.01)

(52) U.S. Cl.
CPC ........... *H04W 24/10* (2013.01); *H04W 48/12* (2013.01); *H04W 56/0015* (2013.01); *H04W 24/08* (2013.01); *H04W 88/08* (2013.01)

(56) References Cited

U.S. PATENT DOCUMENTS

| | | | |
|---|---|---|---|
| 2013/0196675 A1 | 8/2013 | Xiao et al. | |
| 2013/0288668 A1* | 10/2013 | Pragada | H04W 12/06 455/426.1 |
| 2014/0086173 A1* | 3/2014 | Sadeghi | H04L 5/005 370/329 |
| 2014/0112162 A1* | 4/2014 | Tavildar | H04W 48/08 370/252 |
| 2014/0169326 A1* | 6/2014 | Levanen | H04W 56/00 370/330 |
| 2014/0314000 A1* | 10/2014 | Liu | H04W 72/042 370/329 |
| 2014/0334399 A1* | 11/2014 | Xu | H04W 72/1273 370/329 |
| 2015/0004969 A1* | 1/2015 | Han | H04W 52/0251 455/434 |
| 2015/0049649 A1* | 2/2015 | Zhu | H04W 24/02 370/277 |
| 2015/0181406 A1* | 6/2015 | Seo | H04W 8/005 370/329 |
| 2015/0327093 A1 | 11/2015 | Yang et al. | |
| 2015/0351003 A1* | 12/2015 | Ahn | H04B 7/2656 455/434 |
| 2015/0358094 A1* | 12/2015 | Yi | H04B 17/318 370/252 |
| 2015/0372851 A1* | 12/2015 | Kakishima | H04W 56/00 370/329 |
| 2015/0373628 A1* | 12/2015 | Hwang | H04W 48/16 370/338 |
| 2016/0007269 A1* | 1/2016 | Chae | H04L 5/0048 370/330 |
| 2016/0050617 A1* | 2/2016 | Hwang | H04L 5/001 455/434 |
| 2016/0057664 A1* | 2/2016 | Ahn | H04J 11/0069 370/331 |
| 2016/0066255 A1* | 3/2016 | Marinier | H04W 48/16 370/350 |
| 2016/0142898 A1* | 5/2016 | Poitau | H04W 76/14 370/329 |

FOREIGN PATENT DOCUMENTS

| | | |
|---|---|---|
| CN | 102546113 A | 7/2012 |
| CN | 102823168 A | 12/2012 |
| CN | 103220066 A | 7/2013 |
| CN | 103312434 A | 9/2013 |
| CN | 103581993 A | 2/2014 |
| CN | 103686689 A | 3/2014 |
| WO | 2014010850 A1 | 1/2014 |
| WO | 2014040258 A1 | 3/2014 |

OTHER PUBLICATIONS

European Search Report dated Apr. 4, 2017 for EP Application No. 14893431.8.
"3rd Generation Partnership Project; Technical Specification Group Radio Access Network; Small cell enhancements for E-UTRA and E-UTRAN—Physical layer aspects (Release 12)", 3rd Generation Partnership Project (3GPP), France, vol. RAN WGI, No. V12.0.0, Sep. 20, 2013.
Interdigital: "Evaluation scenarios and methodology for LTE D2D", R1-131345, 3rd Generation Partnership Project (3GPP), France, vol. RAN WGI, No. Chicago, USA; Apr. 6, 2013.
NEC Group: "Discussion on possible small cell discovery schemes", R1-134255, 3rd Generation Partnership Project (3GPP), France, vol. RAN WGI, No. Guangzhou, China; Sep. 27, 2013.
Ericsson: "Design of Discovery Bursts and Procedures", R1-141642, 3rd Generation Partnership Project (3GPP), France, vol. RAN WGI, No. Shenzhen, China, Mar. 30, 2014.
NTT Docomo: "Views on detailed design of discovery signal for Rel. 12 discovery procedure", R1-142259 Views on Discovery Signal Design R2, 3rd Generation Partnership Project (3GPP), France, vol. RAN WGI, No. Seoul, Korea; May 18, 2014.
Ericsson: "Design of Discovery Signals and Procedures", R1-142386, 3rd Generation Partnership Project (3GPP); France, vol. RAN WGI, No. Seoul, Korea; May 18, 2014.
Chinese Office Action dated Jan. 14, 2019 in Chinese Application No. 201410228839.0, and English Translation.
"Discovery Signal Design Based on Legacy Signals," ETRI, 3GPP TSG RAN WG1 Meeting #73, Section 2, May 2013, published May 24, 2013.

* cited by examiner

DISCOVERY SIGNAL PROCESSING METHOD AND BASE STATION

CROSS-REFERENCE TO RELATED APPLICATION(S)

This application is the U.S. National Phase application of PCT application number PCT/CN2014/086755 having a PCT filing date of Sep. 17, 2014, which claims the priority of Chinese patent application 201410228839.0 filed on May 27, 2014, the entire disclosures of which are incorporated herein by reference.

TECHNICAL FIELD

The present document relates to the field of communication, and particularly, to a processing method for a discovery signal, and a base station.

BACKGROUND

The Small Cell technology uses low-power radio access nodes, and may be used to extend the coverage range of a Macro Cell to offload growing data flow of the Macro Cell and increase the utility efficiency of radio spectrum resources. Currently, the LTE-Advanced system uses the Small Cell technology to improve the network capacity.

Typically, the Small Cell has a small size, and its coverage range is between 10 meters to 2 kilometers. The deployment scenario of the Small Cell of the LTE network is more flexible, for example, the Small Cell deployment scenario in the LET network may include two levels: the Macro Cell and Small Cell, herein, the Macro Cell and the Small Cell may be deployed at the same frequency point, that is, co-channel deployment; or they may be deployed at different frequency points, that is, non-co-channel deployment. The Macro Cell may not be deployed, and only the Small Cell is deployed in the deployment scenario of the Small Cell of the LTE network. In addition, the Small Cell may be deployed in indoor environments, and may also be deployed in outdoor environments, and it may be deployed sparsely or densely.

The Small Cell is an interference-limited system, and there are complex interference relationships between the Macro Cell and Small Cell, as well as between the Small Cell and the Small Cell. Each cell dynamically schedules to serve terminals within the cell respectively. In addition, as the user equipment UE moves, there are UE continuously moving in and moving out of the Small Cell, the load and interference of the Small Cell system will show a significant fluctuation. Therefore, a certain interference coordination method must be adopted to inhibit and coordinate the interference in the Small Cell. For example, Small Cell adaptive switching mechanism and adaptive power adjustment mechanism.

Herein, the basic concept of the Small Cell adaptive switching mechanism is to adaptively open or close some Small Cells with very low load to reduce inter-cell interference. An opened cell is called an activated cell, and the activated cell normally transmits data channels and common channels. A closed cell is called a dormant cell, and the dormant cell closes data channels and some of common channels. However, both the activated cell and the dormant cell may transmit the cell Discovery Signal DS that is used for the cell discovery and selection, activation/deactivation judgment, and so on.

Currently, the existing reference signal, for example, Channel State Information Reference Signal CSI-RS, is taken typically as the DS resource. However, the function of the existing CSI-RS itself is configured for realizing CSI measurement, so that both a time-domain density and a number of antennas are relatively large. For the deployment scenario of the Small Cell, it is needed to measure more cells when the DS is being measured. Generally, a number of ports of CSI-RS transmitting antennas used for CSI measurement is relatively large, and a cycle is relatively short, and the DS doesn't need so many antenna ports or such short cycle. That is, if multiplexing directly the existing CSI-RS resource for the DS, it will undoubtedly cause a problem of unnecessary radio resource overheads.

SUMMARY

The technical problem to be solved by the embodiments of the present document is to provide a processing method for a discovery signal, and a base station, which can reduce radio resource overheads and improve spectral efficiency.

A processing method for a discovery signal includes:

a base station configuring a part of available resources, which are taken as a Discovery Signal, DS, resource, of a specified reference signal in a first scenario; and the base station transmitting a DS according to a DS resource configuration.

In an example embodiment, the method further includes: the base station configuring all of available resources, which are taken as the DS resource, of the specified reference signal in a second scenario.

In an example embodiment, the specified reference signal includes a Channel State Information Reference Signal, CSI-RS; the DS resource configuration includes:

configuring a CSI-RS resource of one or more of the antenna ports of the CSI-RS as the DS resource, or, independently configuring the CSI-RS resource of one or more antenna ports as the DS resource.

In an example embodiment, the DS resource includes a combination of the part of available resources of the CSI-RS and other signal resource; herein, the other signal includes one or a combination of any ones of a Primary Synchronization Signal/Secondary Synchronization Signal, PSS/SSS, a Cell-specific Reference Signal, CRS, and a Positioning Reference Signal, PRS.

In an example embodiment, the DS resource configuration further includes: configuring the antenna port of the CSI-RS resource and an antenna port of the other signal to map consistently;

or, configuring the antenna port of the CSI-RS resource and the antenna port of the other signal to map to different ports, respectively.

In an example embodiment, the CSI-RS resource configured as the DS resource and the existing CSI-RS resource which is used to measure the channel state information, CSI, are orthogonal to each other.

In an example embodiment, the specified reference signal includes a PSS/SSS;

the DS resource includes any combination of the part of available resources of the PSS/SSS, and one or more of the CSI-RS resource, or the CRS resource, or the PRS resource.

In an example embodiment, transmitted DS burst structures in the same cell are different; or, in a cell cluster, each of transmitted DS burst structures in a part of cells includes all signals used to configure the DS resource, and transmitted DS burst structures in remaining cells include a part of signals used to configure the DS resource; or, each of the transmitted DS burst structures includes all signals used to configure the DS resource.

In an example embodiment, the DS resource includes the PSS/SSS resource and the CSI-RS resource; the configuration further includes:

the base station configuring the terminal to realize synchronization based on the PSS/SSS, and perform RRM measurement based on the CSI/RS;

configuring independently logical IDs and logical antenna ports corresponding to the PSS/SSS and the CSI-RS, respectively, and configuring mapping relationships consistently or inconsistently;

configuring independently a CSI-RS resource component of the DS resource and a CSI-RS resource used for CSI measurement, or the CSI-RS resource component of the DS resource being composed of a part of the CSI-RS ports and a period used for the CSI measurement.

In an example embodiment, the method further includes: the base station notifying the terminal to measure the DS according to the DS resource configuration.

In an example embodiment, information of the DS resource configuration which notifies the terminal includes:

a cell identity for DS measurement and a corresponding measurement pattern of the discovery signal; or, whether a measured cell is synchronous with the cell where the terminal resides, and/or the measured cell, and a synchronization offset between the measured cell and the cell where the terminal resides.

In an example embodiment, the method further includes: initializing a pseudo-random noise, PN, sequence by a Physical Cell identity, PCI, or an Access Point identity, API.

A base station, including:

a configuration module, configured to: configure a DS resource, which includes taking a part of available resources of a specified reference signal as the DS resource in a first scenario; and a transmission module, configured to transmit a DS according to a DS resource configuration.

In an example embodiment, the configuration module is further configured to configure all of available resources, which are taken as the DS resource, of the specified reference signal in a second scenario.

In an example embodiment, the specified reference signal is a CSI-RS;

the DS resource includes a combination of a part of available resources of the CSI-RS and other signal resource; herein, the other signal includes one or a combination of any ones of a Primary Synchronization Signal/Secondary Synchronization Signal, PSS/SSS, a Cell-specific Reference Signal, CRS, and a Positioning Reference Signal, PRS.

In an example embodiment, the configuring module is further configured to:

configure a CSI-RS resource of one or more of the antenna ports where the CSI-RS is transmitted as the DS resource, or, independently configuring the CSI-RS resource of one or more antenna ports as the DS resource.

In an example embodiment, the configuring module is further configured to, configure the antenna port of the CSI-RS resource and an antenna port of the other signal to map consistently;

or, configure the antenna port of the CSI-RS resource and an antenna port of the other signal to map to different ports, respectively.

In an example embodiment, the specified reference signal includes a PSS/SSS;

the DS resource includes any combination of a part of available resources of the PSS/SSS, and one or more, of the CSI-RS resource, or the CRS resource, or the PRS resource.

In an example embodiment, the configuration module is further configured to, configure transmitted DS burst structures in a same cell to be different; or, in a cell cluster, configure each of the transmitted DS burst structures in a part of cells includes all signals used to configure the DS resource, and the transmitted DS burst structures in remaining cells include a part of signals used to configure the DS resource; or, configure each of the transmitted DS burst structures includes all signals used to configure the DS resource.

In an example embodiment, the DS resource includes a part of available resources of the PSS/SSS and the CSI-RS resource; the configuration module is further configured to, configure the terminal to realize synchronization based on the PSS/SSS, and perform RRM measurement based on the CSI/RS;

configure independently logical IDs and logical antenna ports corresponding to the PSS/SSS and the CSI-RS respectively, and configure mapping relationships consistently or inconsistently;

configure independently a CSI-RS resource component of the DS resource and a CSI-RS resource used for CSI measurement, or configure the CSI-RS resource component of the DS resource to be composed of a part of the CSI-RS ports and a period used for the CSI measurement.

In an example embodiment, the base station further includes a notification module, which is configured to notify a terminal to measure the DS according to the DS resource configuration;

information of the DS resource configuration which is used for notifying the terminal includes:

a cell identity for DS measurement and a corresponding measurement pattern of the discovery signal; or, whether a measured cell is synchronous with a cell where the terminal resides, and/or a synchronization offset between the measured cell and the cell where the terminal resides.

In an example embodiment, the CSI-RS resource configured as the DS resource, and the CSI-RS resource used to measure channel state information, CSI, are orthogonal to each other.

A computer program includes program instructions, herein, when the program instructions are executed by a base station, the base station can execute the abovementioned method.

A carrier carries the abovementioned computer program.

In the processing method for the discovery signal in the embodiments of the present document, in a first scenario, only a part of available resources of a specified reference signal, such as the CSI-RS, which are taken as the DS resource, are configured, which reduces radio resource overheads and improve spectral efficiency. In the embodiments of the present document, all of available resources, which are taken as the DS resource, of a specified reference signal are configured in a second scenario, herein, the specified reference signal may be a CSI-RS, which realizing compatibility with the existing DS processing method.

DETAILED EMBODIMENTS OF THE PRESENT DOCUMENT

In order to make the purpose, technical solution and advantages of the present document more clear, the embodiments of the present document will be further described in detail in conjunction with the accompanying drawings below. It should be illustrated that, under the situation of no conflict, the embodiments and the features in the embodiments in the present application can be freely combined with each other.

Figure 1:
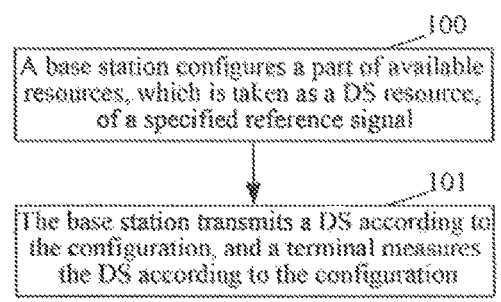
FIG. 1 is a flow chart of a processing method for a discovery signal in accordance with an embodiment of the present document.

FIG. 1 is a flow chart of a processing method for a discovery signal in accordance with an embodiment of the present document, and as shown in FIG. 1, the processing method includes:

In step 100, a base station configures a part of available resources, which is taken as a DS resource, of a specified reference signal.

In this step, the specified reference signal may be a CSI-RS, and the DS resource includes a combination of the part of the available resources of the CSI-RS, and one or any ones of other signal resources, such as a Primary Synchronization Signal/Secondary Synchronization Signal PSS/SSS, a Cell-specific Reference Signal CRS, and a Positioning Reference Signal PRS. Herein, a CSI-RS resource which is used as a DS component is referred to as a DS-RS for short.

The specific implementation of the configuration in this step includes: the CSI-RS resource transmitted by one or more of antenna ports where the CSI-RS is transmitted is configured as the DS resource; or, the CSI-RS resource transmitted by one or more antenna ports is independently configured as the DS resource.

In an example embodiment, the antenna port of the CSI-RS resource which is taken as a DS resource component and an antenna port of other signal resource may be configured to map consistently. For example, if a number of DS ports is 1, and the DS resource is composed of the CSI-RS resource and a PRS resource, then the CSI-RS port 0 resource may be selected to be mapped to a DS port 0, and the PRS resource component may also be mapped to the DS port 0;

they two may also be configured to map to different ports respectively, for example, if the number of the DS ports is 2, and the DS resource is composed of the CSI-RS resource and a PRS resource, then selectively the CSI-RS port 0 resource and the CSI-RS port 1 resource may be mapped to the DS port 0 and the DS port 1, and the PRS resource component may be mapped to the DS port 0, that is, ports of the two resource components are mapped independently.

When the DS resource is combined with the CSI-RS resource and other signal resource, several different signal components play different roles according to their respective features:

for the CSI-RS resource component, since a mechanism of performing neighboring cell puncturing to avoid interference may be adopted, more cells may be better detected and found;

for other signal component, if the other signal resource is the PRS resource, the other signal resource may be used for synchronous detection of a part or all of cells detected and found based on the CSI-RS resource;

if the other signal resource is the CRS resource, the other signal resource may be used for RRM measurement of a part or all of cells detected and found based on the CSI-RS resource;

if the other signal resource is the PSS/SSS resources, the other signal resource may be used for synchronous measurement of a part or all of cells detected and found based on the CSI-RS resource.

In this step, the specified reference signal may be a PSS/SSS as well, and the DS resource includes a combination of the part of the available resources of the CSI-RS, and one or any ones of other signals, such as a Primary Synchronization Signal/Secondary Synchronization Signal PSS/SSS, a Cell-specific Reference Signal CRS, and a Positioning Reference Signal PRS. Herein, the CSI-RS resource which is used as a DS component is referred to as a DS-RS for short.

In this step, DS burst structures may be composed of different components. For example, in the same cell, the DS burst structures with different components may be configured; or, in a plurality of cells, the DS burst structures with different components each other may be configured, that is, in a cell cluster, only each of transmitted DS burst structures in a part of cells includes all signals used to configure the DS resource, but the transmitted DS burst structures in other cells only include part types of signals used to configure the DS resource; or, each of the transmitted DS burst structures includes all signals used to configure the DS resource.

In step 101, the base station transmits the DS according to the configuration, and a terminal measures the DS according to the configuration.

The step further includes: the base station notifies the terminal to measure the DS according to the configuration. For example, the terminal is notified by radio resource control signaling to measure the discovery signal according to the configuration. Herein, configuration information for notifying the terminal includes: a cell set for DS measurement, i.e. cell identity and corresponding measurement pattern of the discovery signal; or whether a measured cell is synchronous with a cell where the terminal resides, and/or a synchronization offset between the measured cell and the cell where the terminal resides.

In the processing method for the discovery signal in the embodiments of the present document, only a part of available resources of a specified reference signal, such as the CSI-RS, which are taken as the DS resource, are configured, which reduces radio resource overheads and improves spectral efficiency.

In the embodiment, a part of available resources of the specified reference signal which are taken as the DS resources may be configured in the first scenario, and all of available resources of the specified reference signal which are taken as the DS resources may be configured in the second scenario according to pre-selected solution. Herein, the specified reference signal may be the CSI-RS. Although configuring all of the available resources of the specified reference signal which are taken as the DS resources will bring more resource overheads and possible interference, a more accurate measurement result may be obtained. The skilled in the art may select the part or all of the available resources as the DS resource to be configured according to a specified demand.

For example, it is assumed that there are a Cell_1, Cell_2, Cell_3, user equipment 1 UE1, UE2, and UE3. In the embodiment, it is assumed that a subset of sequences and available patterns of the CSI-RS, which are taken as the available resources of the DS, are selected to process the DS resource.

Specifically, in the embodiment, available Resource element RE positions of the DS are a subset of a set of available RE positions of the CSI-RS; a period of the DS may be configured to be longer than a period of the CSI-RS; and the period of the DS equals to the available period of the CSI-RS or times of the available period of the CSI-RS; the number of DS ports in one cell is generally less than the number of the CSI-RS ports, a resource used by the DS is resource of part of CSI-RS ports, it is assumed that a preferred configuration in the embodiment is port 1/0, or 2/3, or 4/5, or 6/7 of the CSI-RS.

The DS port mapping may include the following two solutions:

In one solution, a CSI-RS resource transmitted by one or more of the antenna ports transmitting the CSI-RS is configured as the DS resource. Specifically, the antenna port of the cell transmitting the CSI-RS is configured, herein, a part of the ports are selected to transmit the DS resource. For example, it is assumed that the Cell_1 is configured with 8 CSI-RS antenna ports, a port 0 and a port 1 of which are defined as the DS ports. The port 0 and the port 1 used for the DS are configured according to the demand of the DS: if powers of the DS and the CSI-RS are required to be configured different, the powers of the port 0 and the port 1 and the powers of other ports are configured independently; when open/closed operation is performed on the cell, if the DS is required to be transmitted too when the cell is closed, only signals of the port 0 and the port 1 may be transmitted, and a CSI-RS signal of other ports may be stopped transmitting when the cell is closed; if the neighboring cell is required to be configured not to transmit signal in an RE position where the Cell_1 transmits the DS, then not only the port 0 and port 1 are required to perform interference avoidance on an RE position corresponding to other neighboring cell (for example, the corresponding RE position doesn't transmit a signal) as other CSI-RS according to the demand of the CSI-RS, but also the other cell is required to perform interference avoidance on the RE position corresponding to the neighboring cell (for example, the corresponding RE position doesn't transmit a signal) according to the demand of interference avoidance of the DS itself. For example, it is assumed that a set of neighboring cells required to be performed interference avoidance on the CSI-RS of the Cell_1 is A, a set of the RE resources is B; a set of neighboring cells required to be performed interference avoidance on the DS of the Cell_1 is C, and a set of the RE resource is D, then a set of cells of the port 0 and port 1 of the Cell_1 required interference avoidance of the neighboring cell is AUC, and a set of the RE required interference avoidance is BUD. Herein, the symbol "u" represents a union set.

In the other solution, the CSI-RS resource transmitted by one or more antenna ports is independently configured as DS resource. Herein, one or more antenna ports of the discovery signals, which are independently configured, are independent of the antenna port of the channel state information reference signal. In other words, the CSI-RS and the DS are configured independently and respectively, the positions of time-frequency resources they occupied are different, and the antenna ports are different mapped. For example, only the CSI-RS transmitted by a part of the antenna ports are configured to be used by the DS, and other antenna ports don't transmit the CSI-RS. Selected configuration combination of the CSI-RS port resources are 1/0, 2/3, 4/5, and 6/7, i.e. if the number of the port is 1, a resource corresponding to the port1, or port 2, or port 4, or port 6 is selected; if the number of the ports is 2, resources corresponding to the port 0 and the port 1, or the port 2 and the port 3, or the port 4 and the port 5, or the port 6 and the port 7 are selected. Additionally, the power of the CSI-RS corresponding to the DS is not adapted with the power adaption, i.e. the power is configured independently of the conventional CSI-RS.

An RE resource of the local cell DS corresponding to the neighboring cell is configured not to transmit a signal. The set of neighboring cells and the set of conventional CSI-RS are independently configured; typically, a size of the set of the cells is larger than a set of cells corresponding to CSI-RS measurement.

In both of the above two solutions, coordinating a pattern relationship of the DS configuration between cells, and puncturing one another may be adopted. That is, the DS resources transmitted by the Cell_1 and the Cell_2 may be orthogonally configured; for the RE position where the Cell_1 transmits the DS, the Cell_2 adjacent to the Cell_1 may configure the corresponding RE position not to transmit a signal to avoid DS interference of the Cell_2 to the Cell_1. Cell_1 may notify the Cell_2 about DS information configured and transmitted by the Cell_1 through a communication interface between the Cell_1 and the Cell_2, the Cell_2 refers to the DS information of the Cell_1 to determine the DS transmission of the Cell_2 itself and DS interference avoidance for the Cell_1.

With the technical solution provided in the embodiments of the present document, after the CSI-RS resource is used for the DS resource, since the sequence initialization may adopt an identical ID used by a plurality of cells for scrambling with respect to the CSI-RS for the purpose of the CSI, and the DS requires to distinguish different logical cells, or a virtual Cell identity CID, which is different from the CSI measurement requirement, so the sequences of the CSI-RS corresponding to the CSI should be different from the sequence of the CSI-RS corresponding to the DS. Therefore, the method further includes: it is to initialize a pseudo-random noise PN sequence. Initializing a pseudo-random sequence used by the DS may be realized with a Physical Cell identity PCI or an Access Point identity API. For an orthogonal sequence used by the CSI-RS, the DS may multiplex it.

In step 100 of the embodiments of the present document, realizing a plurality of types of signal component to configure the DS resource may further include, but not limit to the following ways:

in way 1, each of the transmitted signal structures includes all signals used to configure the DS resource, for example, the DS is composed of the PSS/SSS and one or more of the CSI-RS, CRS, and PRS. For example, taking the DS including the PSS/SSS and CSI-RS as an example, then each DS burst structure contains the PSS/SSS and the CSI-RS signal at same time. Similarly, if the DS contains one or more of the CRS, the PRS, and the CSI-RS, each of DS burst structures contains the PSS/SSS and the CSI-RS signal at same time.

Since the different types of signals of the DS components have different functions, and all different types of signals are beneficial for the UE to realize all detection and measurement functions in each DS burst.

In way 2, in one cell cluster, i.e. a plurality of cells, only each transmitted signal structure in a part of cells includes all signals used to configure the DS resource, but other cells only contains part types of signals.

For example, taking the DS including the PSS/SSS signal component and CSI-RS signal component as an example, it is assumed that each of the DS burst structures of the Cell_1 (or a transmission point 1) contains the PSS/SSS and the CSI-RS signals at same time. Similarly, if the DS contains a combination of the PSS/SSS and one or more of the CRS, the PRS, and the CSI-RS, each of the DS burst structures contains the PSS/SSS and one or more signals of the CRS, the PRS, and the CSI-RS at same time. The Cell_2 (or a transmission point 2) is synchronized based on the PSS/SSS of the Cell_1 (or the transmission point 1), and each of the DS burst structures only contains the CSI-RS signal. Similarly, if the DS contains one or a combination of ones of the CRS, the PRS, and the CSI-RS, each of the DS burst structures only contains a signal of one or a combination of ones of the CRS, the PRS, and the CSI-RS.

In way 3, in one cell, the DS burst structures with different components may be configured.

For example, taking the DS including the PSS/SSS, the CSI-RS and the CRS signal components as an example, a DS burst structure 1 is that the DS burst structure includes the PSS/SSS, the CSI-RS and the CRS signals at the same time; a DS burst structure 2 is that each DS burst structure includes the CSI-RS signal only; a DS burst structure 3 is that each DS burst structure includes the CRS signal only; a DS burst structure 4 is that each DS burst structure includes the CRS signal and the CSI-RS signal at the same time; a DS burst structure 5 is that each of the DS burst structures includes the PSS/SSS and the CRS signals at the same time; a DS burst structure 6 is that each of the DS burst structures includes the PSS/SSS and the CRI-RS signals at the same time; a DS burst structure 7 is that each of the DS burst structures includes the PSS/SSS signal only.

One or more of the abovementioned burst structures may be configured in different transmission period of one cell or transmission point TP to realize various purposes with the types of the signal components.

Thus, the UE may obtain the synchronization of the cell or the transmission point based on the PSS/SSS, perform RRM measurement and obtain a Cell/TP ID, etc. with the CSI-RS component, perform RRM measurement and obtain a Cell ID with the CSR component. Generally speaking, the RRM measurement based on the CRS is more accurate than the RRM measurement based on the CSI-RS.

It can be seen from the embodiment in which a plurality types of signal components are used to realize the DS resource configuration, with the method of transmitting only the burst structure including a part of the DS in the embodiments of the present document, the resources occupied for transmitting signals are reduced as much as possible, so that the overheads and the interference are reduced.

In the embodiments of the present document, the principle of configuring the DS resource is that: if it is required to trace the synchronization more closely, the period of the burst including the PSS/SSS component may be configured to be shorter; if it is required the RRM measurement more accurate and timely, the period of the burst including the CSI-RS or the CRS component may be configured to be shorter.

Meanwhile, in the embodiments of the present document, the specific implementation of configuring the DS resource is beneficial to coordinate a configuration relationship between different cells and transmission points, by the way of configuring different burst structures in different cells and at different periods, it is beneficial to coordinate a relationship between resources of each other, for example, coordinating a time-frequency orthogonal relationship between each other, etc.

For a case that the DS is composed of the PSS/SSS and the CSI-RS, the base station configures the UE to perform synchronization based on the PSS/SSS, and perform RRM measurement based on the CSI/RS. The logical IDs and logical antenna ports corresponding to the PSS/SSS and the CSI-RS may be configured independently and respectively, and mapping relationships may be configured consistently, and may also be configured inconsistently. The CSI-RS component of the DS may be configured independently of an existing conventional CSI-RS used for CSI measurement, or composed of a part of the existing conventional CSI-RS ports and periods used for CSI measurement.

Taking configuring the DS for the Cell1 as an example, it is assumed that the DS includes the PSS/SSS and the CSI-RS, and the PSS/SSS component of the DS is consistent with the conventional PSS/SSS sequence of the Cell1, i.e. the corresponding ID is a PCI of the Cell1, and port mappings may be maintained consistently. When the Cell1 enters a closed state, a transmission period may be longer than a conventional PSS/SSS of the Cell1. The conventional PSS/SSS of the Cell1 may also be directly configured to be used, only of a part of resources of period are configured to be used. For example, the conventional PSS/SSS period of the Cell1 is every 5 ms for transmission, the PSS/SSS component of the DS may be a component of the 5×N(ms) period, herein, N>=1. That is, when the cell is in the closed state, the PSS/SSS components of the DS are transmitted in a 5×N (ms) period. When the cell is in an open state, there are two ways:

in way 11, the UE is configured to measure the PSS/SSS components of the DS in the 5×N(ms) period sequentially, and it is assumed that only the PSS/SSS of this cycle in the conventional PSS/SSS components belongs to the PSS/SSS components of the DS. Or, in way 12, all of the conventional PSS/SSSs are the PSS/SSS components of the DS.

In an example embodiment, a UE of the cell transmitting the DS may be configured to measure based on the way 12, and a UE of other neighboring cells may be configured to measure in accordance with the way 11.

For the CSI-RS component of the DS, its corresponding logical ID and logical antenna port may be configured independently of the PSS/SSS component of the DS respectively, and at this time, the mapping relationships may be configured consistently, and may also be configured inconsistently. When the cell is in the closed state, the CSI-RS components of the DS are transmitted in a period T, and when the cell is in the open state, there are two ways:

in way 21, the CRS component of the DS is transmitted sequentially in the same way as that in the closed state; or in way 22, the conventional CRS used for CSI measurement may be multiplexed as the CRS component of the DS, including the period and port.

In an example embodiment, a UE of the cell transmitting the DS may be configured to measure based on the way 22. A UE of other neighboring cells may be configured to measure in accordance with the way 21.

Take an application as an example as follows:

(1) A base station configures the Cell_1 to transmit the DS-RS signal which is configured independently of the CSI-RS;

the base station configures an antenna port where the Cell_1 transmits the DS-RS signal;

the base station configures the number of the antenna ports of one cell to be 1 or 2, their patterns and sequences are the patterns and sequences of 1/0, or 2/3, or 4/5, or 6/7 of the CSI-RS.

When there is one DS-RS port, the sequence and pattern of 1, or 2, or 4, or 6 of the CSI-RS are preferred; when there are two DS-RS ports, the used patterns and sequences are the patterns and sequences corresponding to the ports 1/0, or 2/3, or 4/5, or 6/7 of the CSI-RS. The number of the CSI-RS antenna ports is generally greater than or equal to the number of the DS-RS antenna ports.

(2) The Cell_2 and the Cell_3 are configured to be time-frequency staggered with the DS-RS of the Cell_1; and the Cell_2 and the Cell_3 are configured not to transmit data corresponding to a time-frequency resource position where the Cell_1 transmits the DS-RS (i.e. an RE position occupied by the DS-RS). Thus, the Cell_2 and the Cell_3 will not interfere with the time-frequency resource position of the DS-RS of the Cell_1. The CSI-RSs in different cells may also be configured to be time-frequency staggered with each other, and the neighboring cell is configured not to transmit data at a time-frequency resource position corresponding to local CSI-RS, but they are staggered with each other and a set of cells which interleave with each other and do not transmit data is configured independently of the DS-RS, that is, the sets of them may be: same, partially overlapped, not overlapped. A set of the CSI-RS cells is configured based on a CSI measurement requirement, and a set of the DS-RS cells is configured based on a cell discovery and measurement requirement. Generally speaking, the set of the DS-RS cells is larger than a set of the CSI-RS cells.

A set A of the REs of neighboring cells corresponds to the RE position in the Cell_1 which transmits the DS-RS, herein, a set B of the REs which doesn't transmit data may be: A=B, B∈A, A∈B, A∪B≠ϕ; and the set of REs in the CELL_2 which doesn't transmit data and the set of REs in the CELL_3 which doesn't transmit data may be same or different. In an example embodiment, the distinction of the differences is that time-domain corresponding relationships are different from each other, for example, the periods are different.

The DS-RS is configured to only occupy a part of system frequency bandwidth of a cell for transmission.

For example, the system bandwidth of the Cell_1 is N Resource Blocks RBs (for example, N=100), the DS-RS may be configured to only occupy M RBs of them (for example, M=25).

In an example embodiment, a) when N>=25, M=25; b) when N<25, M=N. The purpose of the solution is that when the system bandwidth is wider, the configuration occupies frequency bandwidth as less as possible to reduce the cost; when the system bandwidth is less, the configuration is required to occupy all the system bandwidth to assure measurement performance.

When a part of system bandwidth is configured to be occupied, with regard to a bandwidth position, there are the following selections:

in a first selection, the DS-RS in different cells are configured to occupy the middle of the system bandwidth, the UE is only required to measure a frequency band in the middle of the system bandwidth, and actions for measuring different cells are consistent, to reduce a complexity of the measurement.

in a second selection, the frequency bands occupied by the cells adjacent to each other are interleaved. The solution is beneficial to subframes of different cells interleave their frequency bands and maintain orthogonal as far as possible when transmitting the DS-RS.

The pseudo-random noise PN sequence used by the DS-RS of the CELL_1 is configured to generate an ID to be used.

The optional solution may include:

a Physical Cell ID PCI of the CELL_1 is configured as one of parameters to generate its PN sequence. It is convenient for the UE to obtain the PCI based on the PN sequence, or rapidly detect the DS-RS based on the known PCI;

an access point identity AP-ID is configured as one of parameters to generate its PN sequence. It is convenient for the UE to obtain the AP-ID based on the PN sequence, or rapidly detect the DS-RS based on the known AP-ID.

The cell may be in the activated state or a dormant state, configuration relationships of transmitted patterns in different states are as follows:

for a cell in the activated state (Cell On), there are two configuration solutions:

in a first solution, only the conventional CSI-RS is configured to be transmitted, but the DS-RS is not configured alone. That is, a part or all of the conventional CSI-RS ports are dedicated to be used for the DS-RS, which can reduce types of the signals, and reduce a complexity of the UE and the system to a certain extent;

in a second solution, the conventional CSI-RS and independently configured DS-RS are configured to be transmitted at the same time, which can unify transmitting actions of the DS-RS when the cell is in the activation state in the deactivation state, and can also unify measuring actions of the UE.

The cell in the dormant state (Cell OFF)

The cell is configured to transmit only the DS-RS, and stop transmitting the conventional CSI-RS.

That is, for the first solution, only a CSI-RS used as the DS-RS is transmitted, but the other conventional CSI-RSs are not transmitted;

for the second solution, only the independently configured DS-RS is transmitted, but the conventional CSI-RS is not transmitted.

The CSI-RS resource used by the DS and the CSI-RS used by the CSI are orthogonal to each other. Since the CSI-RS used by the CSI stops transmitting or retransmits with the ON/OFF of the cell, and performs power adaption with the power adaption. The powers transmitted by different ports are not balance, which will bring the deviation of the CSI measurement, so it is necessary to separate the DS and the conventional CSI-RS to be configured and transmitted independently.

Zero-power CSI-RS is configured, and its period is selected from a set of the CSI-RS periods used by the DS; all or a part of the length of the periods are corresponded to periods of the CSI-RS used by a DS configured by other cells of a set A of the cells. For example, there are a Cell1, a Cell2, and a Cell3, and a Zero-power CSI-RS configured by the Cell 1 is a universal set or a subset of CSI-RS patterns configured by the Cell2 and the Cell3;

the period of the DS measurement is longer than that of the CSI measurement, in particular in the OFF state. If it is to configure the period of the DS measurement is the same as that of the CSI measurement, it means a short period is required for transmission at the time of transmission, which will brings unnecessary overheads.

In the embodiments of the present document, the base station may clearly indicate a resource configured by the UE is used for a purpose of the DS measurement by Radio Resource Control RRC signaling.

In the embodiment, only a port 0 or port 0+port 1 is required to be measured to obtain the DS, even there are more ports, they are not to be configured, so a Physical Downlink Shared Channel PDSCH only requires a muting port 0 or port 0+port 1 (i.e. a part of ports), so the overheads can be reduced.

It is to notify the UE to measure the DS, herein, information for notifying the UE includes:

Information of a cell set A of the DS-RS required to be measured, herein, the information includes a cell identity Cell-ID and corresponding DS-RS measurement pattern (including a used sequence, a time-frequency resource position (a period, occupied RBs, a starting subframe position, etc.), etc.), measuring ID, measuring amount, reporting rules of detection and measurement (for example, a detection reporting threshold, a measurement value reporting threshold, and a maximal number of reporting cells, measurement based on one or more ports of DS-RS, etc.). Herein, the DS-RS measurement patterns are a universal set or sub set of DS transmission patterns.

It may be to indicate that whether the measured cell and the Cell_1 where the UE resides are synchronous, and notify an amount of the synchronization deviation of the measured cell and the Cell_1. If the measured cell is synchronous, the UE performs measurement based on a synchronization assumption to reduce time of the synchronization detection and improve a measurement efficiency; if the measured cell is asynchronous and the amount of the synchronization deviation is not notified, the UE is required to assume the cell to be measured is in an asynchronous state and perform measurement for synchronization, then performs cell discovery measurement; if the measured cell is asynchronous and the amount of synchronization deviation is notified, the UE is required to assume the cell to be measured is in an asynchronous state, and is required to perform synchronization receiving adaption based on the notified amount of synchronization deviation, then performs cell discovery measurement. For an asynchronous cell, if the amount of synchronization deviation (time includes a moment of transmitting the DS/a moment of measuring the DS; a synchronization deviation between the cells) is notified, the time of synchronization detection may be reduced, which can improve the detection efficiency. Whether synchronous and the amount of the synchronization deviation may be from measurement between networks, or may also be from measurement and feedback of other UEs.

Whether synchronous and information for synchronization deviation are required to be exchanged between the cells (and/or between carrier waves).

The UE may also be notified by the system about synchronization reference cell Cell_syc an object of the measured cell, the Cell_1, the UE may synchronize the Cell_1 based on the Cell_syc.

Different measurement patterns are configured according to states of a cell.

If the transmission adopts the first solution, the UE is configured to measure the universal set or subset of the conventional CSI-RSs, in an example embodiment, only the port 0 or the port0+port1 are configured to be measured.

If the transmission adopts the second solution, the UE is configured to measure the universal set or subset of the conventional DS-RSs, which can unify measuring actions of the UE in the activation state and in the deactivation state.

Intra-frequency measurement and inter-frequency measurement configure different measurements respectively. If the measured cell and the service cell where the UE resides are in the same frequency point, the measurement is intra-frequency measurement; otherwise, the measurement is inter-frequency measurement.

Configuration: a Reference Signal Receiving Power RSRP of the intra-frequency measurement, and a Reference Signal Receiving Quality RSRQ of the inter-frequency measurement.

When the inter-frequency measurement is performed, it is to notify the indication whether a target cell is a synchronous carrier.

A target object which is measured and fed back may be configured based on cell discovery information fed back by the UE. That is, firstly, the UE is configured to perform cell discovery detection, and feeds back to the base station; the base station selects a cell set C to be further measured based on the cell discovery information fed back by the UE; so that the UE is configured to perform Radio Resource Management RRM measurement on the selected cell set C, for example, performs RSRP, RSRP and/or synchronization.

The method in the embodiments of the present document further includes: the UE performs measurement and feedback based on a configuration of the network.

The UE performs measurement and feedback based on a configuration of the base station. It is to configure a short period to feed back the cell discovery information, which mainly includes cell ID information, and also includes levels of signal strength and/or signal quality. A definition of levels of strength, and the quality is configured to the UE by the base station, for example, high, medium, and low three levels.

A period for UE feeding back the information of the signal strength and/or quality may be configured longer.

Figure 2:
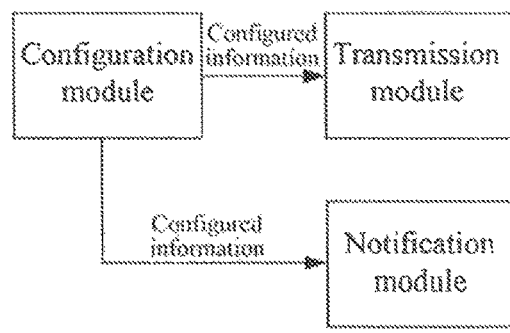
FIG. 2 is a schematic diagram of a component structure of a base station in accordance with an embodiment of the present document.

FIG. 2 is a structural diagram of components of a base station according to the present document, and as shown in FIG. 2, the base station at least includes:

a configuration module, configured to: configure a DS resource, which includes a part of available resources of a specified reference signal are taken as the DS resource in a first scenario; and may further includes all of available resources of the specified reference signal which are taken as the DS resources are configured in the second scenario.

A transmission module is configured to transmit the DS according to the configuration.

The base station according to the embodiment of the present document further includes a notification module, configured to notify a terminal to measure the DS according to the configuration. The notification module may be specifically configured to notify the terminal by a radio resource control signaling to measure the DS according to the configuration. Herein, configuration information which is used for notifying the terminal includes:

a cell set for DS measurement: a cell identity and a corresponding measurement pattern of the discovery signal; or, whether a measured cell is synchronous with a cell where the terminal resides, and/or a synchronization offset of the measured cell and the cell where the terminal resides.

The specified reference signal is the CSI-RS, and the DS resource includes a combination of a part of the available resources and one or any ones of other signals, such as a Primary Synchronization Signal/Secondary Synchronization Signal PSS/SSS, a Cell-specific Reference Signal CRS, and a Positioning Reference Signal PRS.

The configuration module is specifically configured to configure a CSI-RS resource transmitted by one or more of antenna ports where the CSI-RS is transmitted as the DS resource; or, configure a CSI-RS resource transmitted by one or more ports as the DS resource independently.

The CSI-RS resource configured as the DS resource and the existing CSI-RS resource which is used to detect the channel state information CSI are orthogonal to each other.

The configuration module is further configured to:

configure the antenna port of the CSI-RS resource and an antenna port of the other signal to map consistently;

or, configure the antenna port of the CSI-RS resource and an antenna port of the other signal to map to different ports respectively.

The DS burst structure is that: the transmitted DS burst structures in the same cell are different; or, in a cell cluster, each of transmitted DS burst structures in part of cells includes all signals used to configure the DS resource, and transmitted DS burst structures in the remaining cells include a part of signals used to configure the DS resource; or, each of the transmitted DS burst structures includes all signals used to configure the DS resource.

When the DS resource includes the PSS/SSS resource and the CSI-RS resource, the configuration module is further configured to:

configure the UE to realize synchronization based on the PSS/SSS, and perform RRM measurement based on the CSI/RS;

configure independently logical IDs and logical antenna ports corresponding to the PSS/SSS and the CSI-RS respectively, and configuring mapping relationships consistently or inconsistently;

the CSI-RS resource component of the DS resource is configured independently of an existing conventional CSI-RS resource used for CSI measurement, or composed of a part of the existing conventional CSI-RS ports and a period used for CSI measurement.

Those ordinarily skilled in the art can understand that all or some of steps of the abovementioned method may be completed by the programs instructing the relevant hardware, and the programs may be stored in a computer-readable storage medium, such as read only memory, magnetic or optical disk. In an example embodiment, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

The above description is only the preferred embodiments of the present document. Certainly, the present document can also have a variety of other embodiments. Those skilled in the art can make the corresponding modifications and variations according to the present document without departing from the rule and essence of the present document. And all of these modifications or the variations should be embodied in the protection scope of the appended claims of the present document.

INDUSTRIAL APPLICABILITY

In the processing method of the discovery signal in the embodiments of the present document, only a part of available resources of a specified reference signal, such as the CSI-RS, which are taken as the DS resources, are configured, which reduces radio resource overheads and improve spectral efficiency.

What is claimed is:

1. A processing method for a discovery signal, comprising:

configuring, by a base station, a part of available resources, which are taken as a Discovery Signal (DS) resource, of a specified reference signal in a first scenario; and transmitting, by the base station, a DS according to a DS resource configuration; wherein, the specified reference signal comprises a Channel State Information Reference Signal (CSI-RS); the DS resource configuration comprises:

independently configuring, by the base station, the CSI-RS resource of one or more antenna ports as the DS resource, wherein, one or more antenna ports of the discovery signals, which are independently configured, by the base station, are independent of the one or more antenna ports of the channel state information reference signal, the CSI-RS and the DS are configured independently and respectively;

wherein, the CSI-RS resource configured as the DS resource and an existing CSI-RS resource which is used to measure channel state information (CSI) are orthogonal to each other.

2. The processing method for a discovery signal according to claim 1, wherein the method further comprises: configuring, by the base station, all of available resources, which are taken as the DS resource, of the specified reference signal in a second scenario.

3. The processing method for a discovery signal according to claim 1, wherein, the DS resource comprises: a combination of a part of available resources of CSI-RS and other signal resource; wherein, other signal comprises one or a combination of any ones of a Primary Synchronization Signal/Secondary Synchronization Signal (PSS/SSS) a Cell-specific Reference Signal (CRS) and a Positioning Reference Signal (PRS), wherein, the DS resource configuration further comprises: configuring, by the base station, an antenna port of the CSI-RS resource and an antenna port of the other signal to map to different ports respectively.

4. The processing method for a discovery signal according to claim 1, wherein, the specified reference signal comprises PSS/SSS;

the DS resource comprises any combination of a part of available resources of the PSS/SSS, and one or more of a CSI-RS resource, or a CRS resource, or a PRS resource.

5. The processing method for a discovery signal according to claim 4, wherein, transmitted DS burst structures in a same cell are different; or, in a cell cluster, each of transmitted DS burst structures in a part of cells comprises all signals used to configure the DS resource, and transmitted DS burst structures in remaining cells comprise a part of signals used to configure the DS resource; or, each of the transmitted DS burst structures comprises all signals used to configure the DS resource, wherein, the DS resource comprises the PSS/SSS resource and the CSI-RS resource; the configuration further comprises:

configuring, by the base station, a terminal to realize synchronization based on the PSS/SSS, and perform Radio Resource Management (RRM) measurement based on the CSI-RS;

configuring, by the base station, independently logical IDs and logical antenna ports corresponding to the PSS/

SSS and CSI-RS respectively, and configuring, by the base station, mapping relationships consistently or inconsistently;

configuring, by the base station, independently a CSI-RS resource component of the DS resource and a CSI-RS resource used for CSI measurement, or a CSI-RS resource component of the DS resource being composed of a part of CSI-RS ports and a period used for CSI measurement.

6. The processing method for a discovery signal according to claim 1, the method further comprises: notifying, by the base station, a terminal to measure the DS according to the DS resource configuration, wherein, information of the DS resource configuration which the base station notifies the terminal comprises:

a cell identity for DS measurement and a corresponding measurement pattern of the discovery signal; or, whether a measured cell is synchronous with a cell where the terminal resides, and a synchronization offset between the measured cell and the cell where the terminal resides.

7. The processing method for a discovery signal according to claim 1, the method further comprises: initializing, by the base station, a pseudo-random (PN) sequence by a Physical Cell identity (PCI) or an Access Point identity API).

8. A base station, comprising:

hardware performing instructions stored in a non-transitory computer readable medium which executes steps in following modules;

a configuration module, configured to configure a Discovery Signal, DS, resource, which comprises taking a part of available resources of a specified reference signal as the DS resource in a first scenario; and a transmission module, configured to transmit a DS according to a DS resource configuration; wherein, the specified reference signal is a Channel State Information Reference Signal, CSI-RS;

the DS resource comprises a combination of a part of available resources of the CSI-RS and other signal resource; wherein, other signal comprises one or a combination of any ones of a Primary Synchronization Signal/Secondary Synchronization Signal, PSS/SSS, a Cell-specific Reference Signal, CRS, and a Positioning Reference Signal, PRS; characterized in that the configuration module is configured to:

independently configure a CSI-RS resource of one or more antenna ports as the DS resource, wherein, the one or more antenna ports of the discovery signal, which are independently configured, are independent of the one or more antenna ports of the channel state information reference signal, the CSI-RS and the DS are configured independently and respectively.

9. The base station according to claim 8, wherein, the configuration module is further configured to configure all of available resources, which are taken as the DS resource, of the specified reference signal in a second scenario.

10. The base station according to claim 8, wherein, the configuration module is further configured to, configure an antenna port of the CSI-RS resource and an antenna port of the other signal to map to different ports respectively.

11. The base station according to claim 10, wherein, the CSI-RS resources configured as the DS resource and the CSI-RS resource used to measure channel state information, CSI, are orthogonal to each other.

12. The base station according to claim 8, wherein, the specified reference signal comprises a PSS/SSS;

the DS resource comprises any combination of a part of available resources of the PSS/SSS, and one or more of a CSI-RS resource, or a CRS resource, or a PRS resource.

13. The base station according to claim 12, wherein, the configuration module is further configured to, configure transmitted DS burst structures in a same cell to be different; or, in a cell cluster, configure that each of transmitted DS burst structures in a part of cells comprises all signals used to configure the DS resource, and transmitted DS burst structures in remaining cells comprise a part of signals used to configure the DS resource; or, configure that each of transmitted DS burst structures comprise all signals used to configure the DS resource.

14. The base station according to claim 12, wherein, the DS resource comprises a part of available resources of the PSS/SSS and the CSI-RS resource; the configuration module is further configured to:

configure a terminal to realize synchronization based on the PSS/SSS, and perform Radio Resource Management (RRM), measurement based on the CSI-RS;

configure independently logical IDs and logical antenna ports corresponding to the PSS/SSS and CSI-RS respectively, and configure mapping relationships consistently or inconsistently;

configure independently a CSI-RS resource component of the DS resource and a CSI-RS resource used for CSI measurement, or configure the CSI-RS resource component of the DS resource to be composed of a part of CSI-RS ports and a period used for the CSI measurement.

15. The base station according to claim 8, further comprising a notification module, which is configured to notify a terminal to measure the DS according to the DS resource configuration;

information of the DS resource configuration which is used for notifying the terminal comprises:

a cell identity for DS measurement and a corresponding measurement pattern of the discovery signal; or, whether a measured cell is synchronous with a cell where the terminal resides, and/or a synchronization offset between the measured cell and the cell where the terminal resides.

16. A non-transitory computer readable medium storing computer executable instructions, which when executed by a processor of a base station to implement processing method for a discovery signal by:

configuring a part of available resources, which are taken as a Discovery Signal (DS) resource, of a specified reference signal in a first scenario; and transmitting the DS according to a DS resource configuration; wherein, the specified reference signal comprises a Channel State Information Reference Signal (CSI-RS); the DS resource configuration comprises:

independently configuring the CSI-RS resource of one or more antenna ports as the DS resource, wherein, the one or more antenna ports of the discovery signal, which are independently configured, are independent of the one or more antenna ports of the channel state information reference signal, the CSI-RS and the DS are configured independently and respectively;

wherein, the CSI-RS resource configured as the DS resource and an existing CSI-RS resource which is used to measure channel state information (CSI) are orthogonal to each other.

* * * * *